Nov. 8, 1966 K. CONRAD 3,283,882
CARTON ACCUMULATING CONVEYOR SECTION
Filed Feb. 15, 1965 3 Sheets-Sheet 1

INVENTOR.
KEITH CONRAD
BY J. R. Nelson
and W. A. Schwich
ATTORNEYS

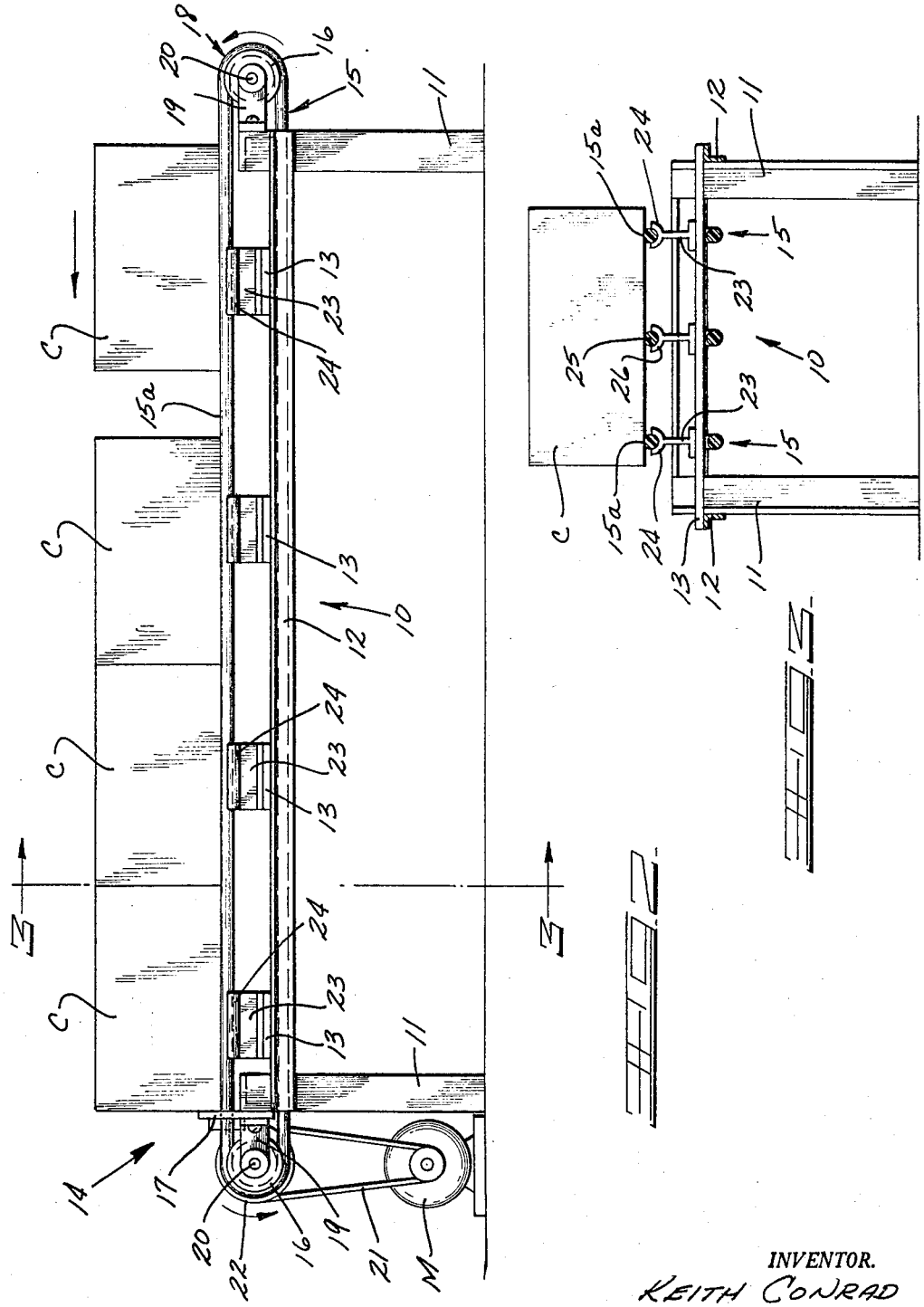

Nov. 8, 1966   K. CONRAD   3,283,882
CARTON ACCUMULATING CONVEYOR SECTION
Filed Feb. 15, 1965   3 Sheets-Sheet 3
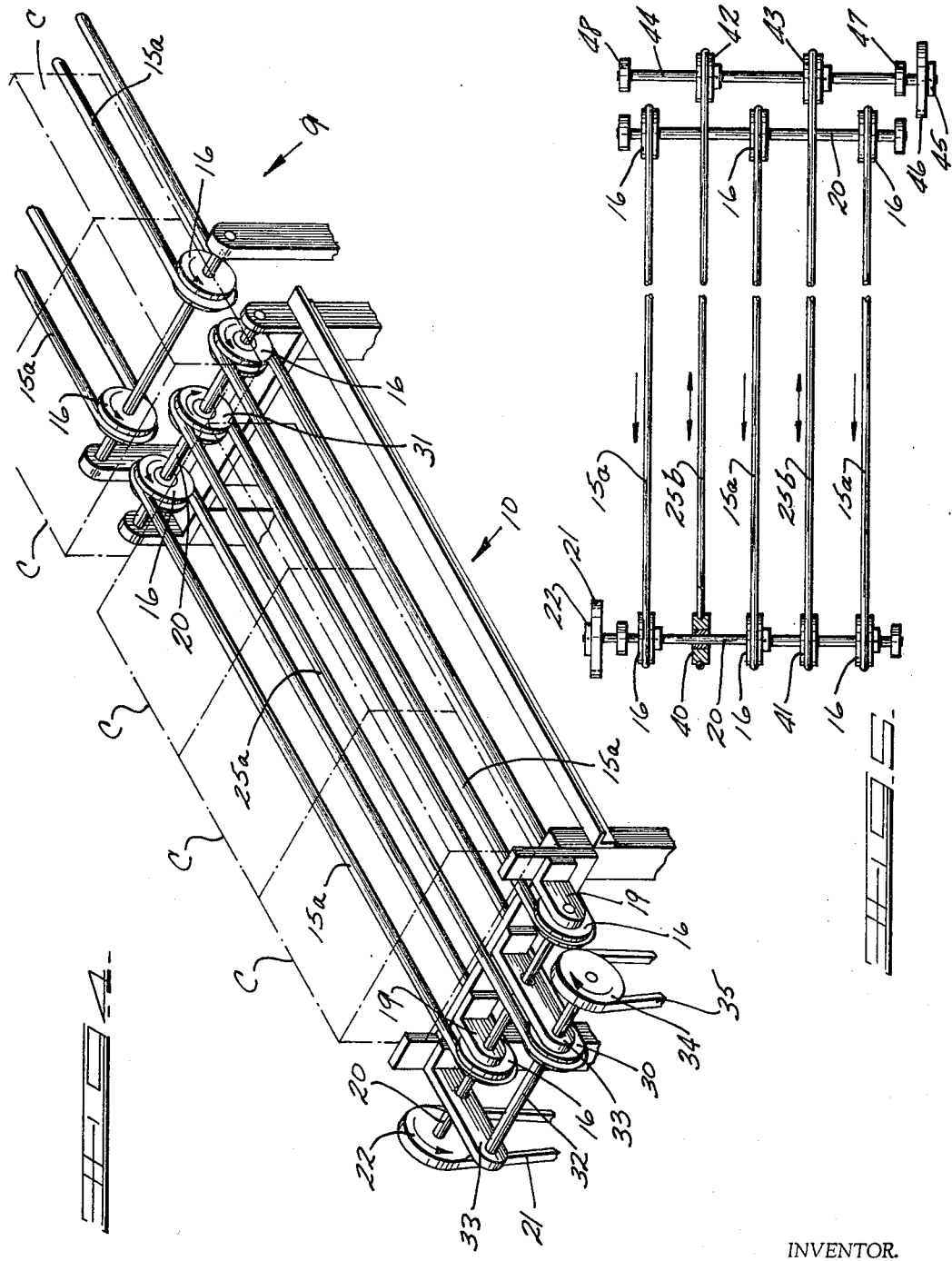
INVENTOR.
KEITH CONRAD
BY J. R. Nelson
and W. A. Schaich
ATTORNEYS

United States Patent Office 3,283,882
Patented Nov. 8, 1966

3,283,882
CARTON ACCUMULATING CONVEYOR SECTION
Keith Conrad, Toledo, Ohio, assignor to Owens-Illinois Inc., a corporation of Ohio
Filed Feb. 15, 1965, Ser. No. 432,777
10 Claims. (Cl. 198—190)

My invention relates to carton conveyors and more particularly to elongated horizontal conveyors which operate continuously to move cartons, filled or empty to a station near one end where they are accumulated or stored, preparatory to loading onto trucks or other conveyances.

An important object of my invention is the provision of novel, exceptionally simple means for preventing or in any event, minimizing, damage to the cartons as they accumulate at this station, such as can occur because of their interfacial contact at the storage end under excessive end pressure as applied by the conveying or propelling means.

A further object of my invention is the provision of a conveyor of the above character in which the carton advancing means comprises continuously moving ropes frictionally engaging the carton bottom and an elongation element positioned and functioning to engage the cartons frictionally so as to lessen the effective carton-advancing pressure of the ropes, to the end that end crushing and excessive bottom scuffing of the cartons can be held to a minimum, if not entirely eliminated.

Another object of the invention is to provide a forward drive means comprised of plural endless ropes frictionally engaging the bottom surface of advancing cartons thereon and a second frictionally engaging element, such as an endless rope or ropes, reeved in parallel array to the dive means, and frictionally engaging the bottom of the cartons, the said second element being capable of controlled movement relative to the forward drive means so as to regulate end or line pressure on accumulating cartons. The number of these second elements being always less than the parallel reaches of rope engaging the cartons for advancing them to the station.

Other objects will be in part apparent and in part pointed out hereinafter.

In the accompanying drawings forming a part of my application:

FIG. 2 is a side elevational view of the conveyor;

FIG. 3 is a sectional elevational view taken substantially along the plane of line 3—3 of FIG. 2;

FIG. 4 is a perspective view of the apparatus of FIG. 3, but illustrating another embodiment of the invention; and FIG. 5 is a schematic plan view of an apparatus illustrating still a further embodiment of the invention.

Figure 1:
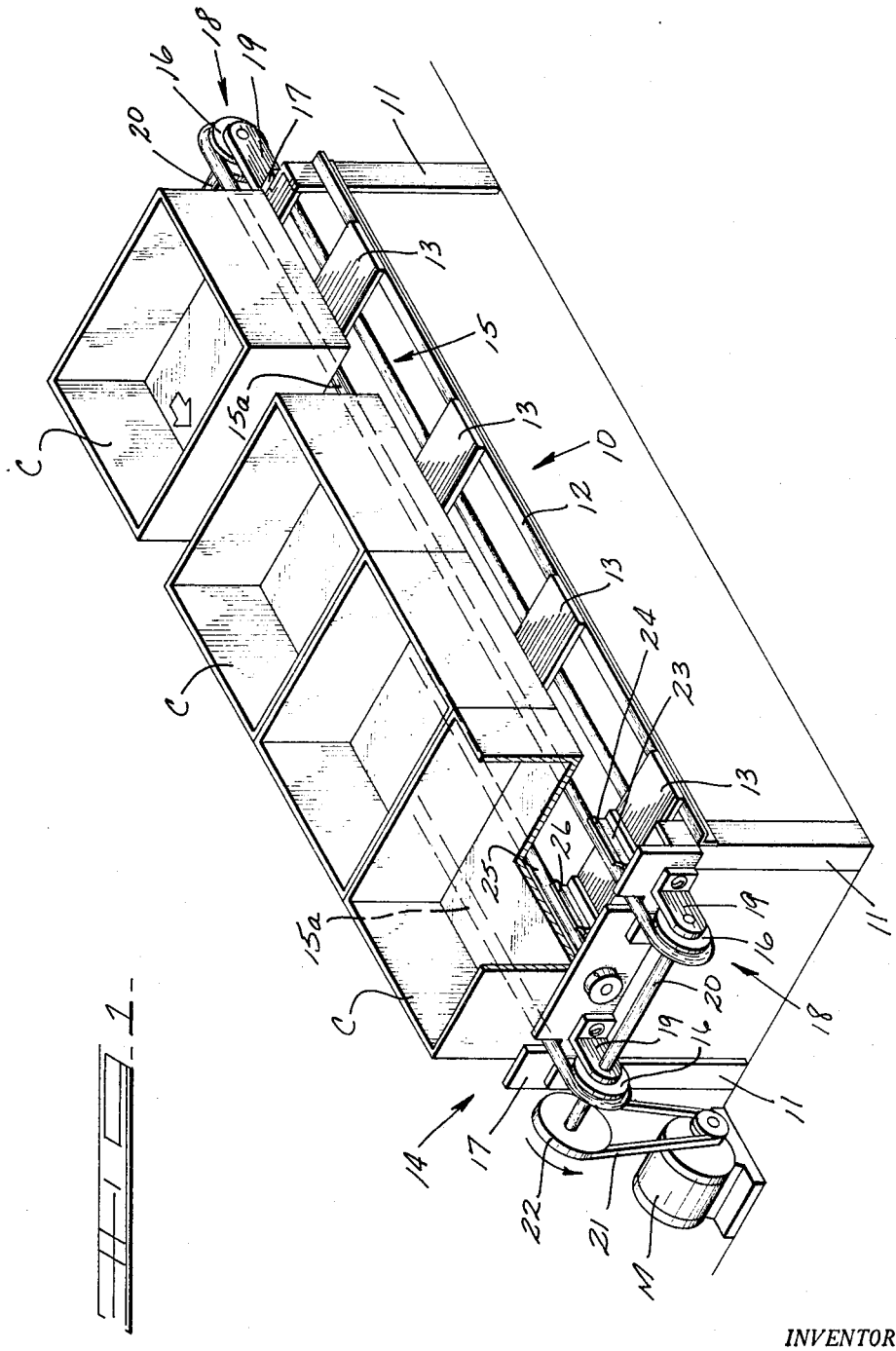
FIG. 1 is a perspective view of an accumulator or storage-type conveyor, embodying my invention.

In the illustrated embodiment of my invention of FIGS. 1–3, the apparatus comprises a horizontal elongated main frame 10 including upstanding supporting legs 11 upon which longitudinal side rails 12 and a plurality of cross-bars 13 rest and are secured. The apparatus of FIG. 1 effectively illustrates a storage area or segment of an elongated conveyor line. This storage area may also be referred to an an accumulator station for cartons C processed and handled on the main conveyor. Cartons C, which are advanced seriatim to the end 14 of the conveyor, rest directly upon a pair of flexible endless elements 15, such preferably being ropes formed of polyethylene or in any event some plastic material having a similar coefficient of friction. Each of these two ropes 15 is trained over pulleys 16, or sheaves, at opposite ends of the main frame 10, these pulleys being positioned near the side rails 12 and exterior to the upstanding cross-members 17. These cross-members 17 are secured to the upper end of the legs 11 and carry bearing brackets 18, each comprising a pair of L-shaped arms 19 bolted or otherwise attached to one of said cross-members. These arms are spaced apart to receive between them one of the pulleys or sheaves 16, there being a horizontal transverse shaft 20 journaled in the arms 19 and directly supporting a pair of the pulleys 16. At the unloading end is an electric motor M which, through an endless belt 21, or chain, imparts rotary motion to a sheave 22, such being secured to one end of the shaft 20 for rotation with it. Thus, with rotation of the sheave 22, the pulleys 16 are rotated in a direction to advance the upper or working reach 15a of the pair of ropes 15 and concurrently therewith advance or propel forwardly to the storage zone, cartons C or other such articles which are resting upon the ropes.

It is of course necessary to properly guide these ropes and do so in such fashion that they can effectively frictionally contact the carton bottoms. To this end I have mounted upon each cross-bar 13, a pair of transversely aligned upstanding arms 23, one near each end of the cross-bar, and with each having at its upper end a U-shaped guide 24 or channel, the depth of which is somewhat less than the diameter of the ropes 15, so that adequate surface area of the ropes is exposed to effectively frictionally contact the carton bottoms and insure movement of the cartons along the conveyor, normally without any appreciable slippage between the cartons and ropes.

Because at times there is a tendency to exert considerable end pressure upon cartons already at rest in the unloading or storage zone (the accumulating station), such resulting from following cartons being urged forwardly by the propelling ropes, I have incorporated in the conveyor, braking means which functions to counteract, to a degree as desirable, the end pressure produced by the ropes 15. To this end I have in one form of the invention interposed between the pair of active propelling ropes 15, a stationary belt 25, or rope, also formed of a plastic material such as polyethylene or in any event one having desirable and similar frictional characteristics, so that when in contact with cartons resting upon the two side ropes 15, it tends to effectively control and counteract end pressure of one carton against another under the influence of said ropes. This stationary belt 25 extends horizontally and longitudinally medially of the conveyor between the two side ropes 15 and at about the same level as said ropes, so as to firmly frictionally engage the carton bottoms. The stationary belt 25, or rope, may be securely anchored in the framework as indicated. Guides 26, similar to the guides 24 for the ropes 15, support the braking belt 25 at the desired level required for effective carton contact. Thus it is apparent that with the braking belt or rope adequately taut, it will effectively reduce the end pressure of the cartons upon each other, by lessening the propelling effectiveness of the side ropes 15. In this fashion crushing and serious scuffing of the cartons is materially reduced, if not completely eliminated.

As illustrated for another form of the invention on FIG. 4, the braking element may be reeved over the end pulley 30 and 31 respectively. The one pulley 31 is rotatably mounted on shaft 20 by the ball bearing so that it is free to turn independently of the one shaft 20. The other pulley 30 is attached on shaft 32 for rotation therewith. The endless reach of belt or rope, which in this embodiment is referred to by numeral 25a, thus runs parallel with the two reaches of belt or rope 15a. The end shaft 32 is rotatably mounted in journal brackets 33, attached integrally as part of the conveyor frame 10, and is driven by the pulley 34 keyed on one end thereof. The pulley 34 is drivably controlled for its rotation by a belt or similar drive 35 running on the drive sheave or pulley of a motor (not shown). This motor may be a variable speed, reversible electric motor drive so that the reach of rope or belt 25a may be moved relatively to the forward movement of the parallel reaches of drive rope 15a of the conveyor. For example, the rope 25a in this embodiment may be driven in the opposite direction to offset to a larger degree the end pressure or force being asserted on the cartons at the accumulating station of the conveyor apparatus. This driving movement can double the braking action of rope 25. Ahead of the accumulator-type conveyor section 10 is a section 9 having advancing ropes or elements 15a delivering cartons C onto the conveyor section 10 which includes the above-described central counter driven rope or element 25a. This illustrates throughout the conveyor length the braking means need not be included. Only in the portion of the conveyor desired as an accumulating section it may be necessary to employ the invention.

A further variation of the invention is illustrated on FIG. 5. It may be desirable to handle cartons or articles wherein more than two reaches of the active drive rope or belt 15a are needed. These three reaches of rope 15a are similarly mounted on end pulleys 16 on their shafts 20. The one shaft 20 has a drive pulley 22 running with the belt 21 connected to the motor M (FIG. 1). This forward drive means imparts frictionally a drive force on the seriatim line of articles arriving at the accumulating station. Intermediate the three belts 15a, are parallel reaches of belts 25b. These belts 25b are carried in running engagement on end pulleys 40, 42 and 41, 43. The end pulleys 40 and 41 are, for sake of convenience, mounted by ball bearings (see cut-away of pulley 40) on shaft 20. The pulleys 42 and 43, on the other hand, are keyed on shaft 44 suitably supported by brackets 47 and 48, integrally a part of the conveyor frame. The end pulley 45 has the belt 46 driving it by connection to a motor (not shown). The motor may be driven in either direction to regulate the braking frictional force on the bottom surface of the cartons, that is, the movement of the ropes 25b relative to the forward movement of the three ropes 15a will regulate end pressure of the abutting cartons as they arrive in the accumulating station, such as shown on FIG. 1. The ropes 25b may, for example, be (1) driven in a reverse direction with respect to movement of ropes 15a, (2) held stationary, or (3) driven in the same direction as movement of ropes 15a, but regulated as to speed with respect to ropes 15a so that the desired braking force is achieved.

Modifications may be resorted to within the spirit and scope of the appended claims.

I claim:
1. An accumulator-type conveyor comprising a horizontal main frame, a pair of endless flexible elements arranged side by side to provide two horizontal parallel carton supporting reaches extending lengthwise of the conveyor, means for moving the carton-supporting reaches at the same lineal speed, and a counter-moving element positioned between and at the same level as said two reaches for continuous braking contact with the bottoms of cartons resting upon the two reaches.

2. A conveyor as defined in claim 1, the counter-moving element being of elongate form and anchored at its ends to said frame in stationary position on the conveyor.

3. The conveyor defined in claim 1, the counter-moving element being of endless elongate form and having an upper, carton-engaging reach, and means connected to said element for relatively moving its carton-engaging reach in a direction opposite the movement of the said carton-supporting reaches.

4. An accumulator-type conveyor comprising a horizontal main frame, a pair of endless parallel horizontally spaced apart ropes providing a pair of carton-supporting reaches extending lengthwise of the frame, sheaves supporting the ropes, means for imparting continuous advancing movement to said reaches thereby to advance cartons in succession along the conveyor, and braking means continuously engaging supported cartons for counteracting the carton-advancing function of said ropes, the braking means being a stationary length of rope extending longitudinally of the conveyor between and at the same level as said carton supporting reaches for frictional contact with the bottoms of cartons riding upon the latter.

5. In a conveyor as defined in claim 4, the braking means comprising at least one endless rope and means movably mounting said rope to provide a carton engaging reach extending parallel to said pair of carton-supporting means and at all times contacting the supported cartons.

6. The conveyor defined by claim 5, including a drive means and means operatively connecting said drive means to the rope mounting means for controlling the movement of said carton engaging reach relative to the bottom of said cartons.

7. An accumulator-type conveyor comprising plural, endless flexible elements, means for mounting said elements in parallel, spaced apart relationship disposed horizontally for providing carton supporting upper reaches of said elements, means connected to said mounting means for imparting continuous advancing movement to said plural reaches to advance said cartons to an accumulating station, a carton-engaging braking means including a reach of a separate flexible element and means mounting said last-mentioned flexible element parallel to and intermediate said plural, parallel, endless flexible elements and in continuous carton bottom engaging relationship for braking effectiveness of the carton-advancing forces being applied by the forwardly driven, carton supporting reaches of said plural elements.

8. The accumulating conveyor defined in claim 7, wherein said plural elements comprise at least three endless, flexible elements and said carton-engaging braking means comprises at least two flexible elements mounted parallel to said three flexible elements.

9. The accumulating conveyor defined in claim 8, wherein said two flexible elements of the braking means are endless, parallel reaches of ropes, said two parallel ropes being positioned on opposite sides of one of said three forwardly driven, endless, flexible elements.

10. The accumulating conveyor defined in claim 9, including means connected to at least one of the two endless ropes and driving said rope in a direction for moving the carton engaging reach thereof counter to the forwardly moving carton supporting upon reaches of said three flexible elements.

References Cited by the Examiner
UNITED STATES PATENTS

| | | | |
|---|---|---|---|
| 2,455,175 | 11/1948 | Hohl | 198—190 X |
| 3,121,490 | 2/1964 | Rainbow | 198—27 X |

EVON C. BLUNK, *Primary Examiner.*

R. E. KRISHER, A. C. HODGSON, *Assistant Examiners.*

UNITED STATES PATENT OFFICE
CERTIFICATE OF CORRECTION

Patent No. 3,283,882 November 8, 1966

Keith Conrad

It is hereby certified that error appears in the above numbered patent requiring correction and that the said Letters Patent should read as corrected below.

Column 1, line 24, for "elongation" read -- elongated --; column 4, line 60, for "upon" read -- upper --.

Signed and sealed this 26th day of December 1967.

(SEAL)
Attest:

Edward M. Fletcher, Jr.       EDWARD J. BRENNER
Attesting Officer      Commissioner of Patents